United States Patent [19]

Brown et al.

[11] 3,838,316

[45] Sept. 24, 1974

[54] ENCAPSULATED ELECTRICAL COMPONENT ASSEMBLY AND METHOD OF FABRICATION

[75] Inventors: Donald R. Brown; John W. Linsley, Jr., both of Downers Grove; Robert F. Porod, Cicero, all of Ill.

[73] Assignee: Western Electric Company, New York, N.Y.

[22] Filed: Oct. 9, 1973

[21] Appl. No.: 404,821

[52] U.S. Cl. ........... 317/101 R, 29/627, 174/52 PE, 264/272, 317/101 CC

[51] Int. Cl. ........................................ H05k 5/06

[58] Field of Search ........... 174/52 PE; 317/99, 100, 317/101 R, 101 CC, 101 CW, 242; 336/96; 338/226, 252, 253, 256, 260, 275; 29/627; 264/272

[56] References Cited

UNITED STATES PATENTS

| | | | |
|---|---|---|---|
| 3,251,015 | 5/1966 | Denham | 264/272 X |
| 3,364,567 | 1/1968 | Brown et al. | 264/272 X |
| 3,383,565 | 5/1968 | Gritton | 317/101 R |
| 3,484,536 | 12/1969 | Jaeschke et al. | 174/52 PE |
| 3,772,452 | 11/1973 | Usowski | 174/52 PE |
| 3,806,766 | 4/1974 | Fanning | 264/272 X |

FOREIGN PATENTS OR APPLICATIONS

| | | | |
|---|---|---|---|
| 308,052 | 3/1929 | Great Britain | 174/52 PE |

*Primary Examiner*—Laramie E. Askin
*Attorney, Agent, or Firm*—D. D. Bosben

[57] ABSTRACT

An encapsulated assembly of electrical components, such as capacitors, which can be mounted on a printed circuit board in straddling relationship to other components, includes an open mouth plastic shell and a plastic frame, each having opposed projecting standoff sections. The frame standoff sections are provided with grooves for receiving leads extending from electrical components assembled within the shell. Encapsulating liquid is introduced into the shell through an opening in the frame to submerge the bodies of the components and until the liquid wets the inner surface of the frame and flows by capillary action upward in passageways defined by the grooves in the frame and the standoff sections of the shell, to secure the leads in the passageways and to bond the frame to the shell. The encapsulating liquid also flows by capillary action upward between the side walls of the shell and the periphery of the frame to bond the frame to the shell, with the upper peripheral edges of the frame preferably depressed with respect to adjacent edges of the shell to prevent excess flow of the liquid over the sides of the shell.

14 Claims, 12 Drawing Figures

ENCAPSULATED ELECTRICAL COMPONENT ASSEMBLY AND METHOD OF FABRICATION

BACKGROUND OF THE INVENTION

1. Field of the Invention

This invention relates to an encapsulated electrical component assembly and a method of fabricating the assembly, and more particularly to an encapsulated electrical component assembly which is capable of being mounted on a printed circuit board in straddling relationship to other components, and which can be readily fabricated with projecting leads of the components rigidly and accurately secured within standoff legs of the assembly.

2. Description of the Prior Art

In the manufacture of electronic circuits it frequently is desirable to encapsulate one or more electrical components in a preformed plastic shell in a manner such that the resultant assembly can be assembled or plugged directly into a printed circuit board. For example, in the U.S. Pat. application Ser. No. 318,790, filed Dec. 27, 1972 (now U.S. pat. No. 3,806,766) in the name of W. J. Fanning and assigned to the same assignee as the subject application, leads of an electrical component initially are preformed and the component then is moved into the shell with the leads riding in grooves in side walls of the shell in a manner such that the leads project from the shell in exact predetermined positions defined by the grooves, to facilitate the subsequent insertion of the leads into preformed apertures in the printed circuit board. With the component spaced from the inner walls of the shell by the leads, the component then is encapsulated in a substantially fluid-impervious dielectric potting material.

The U.S. Pat. No. 3,484,536, issued Dec. 16, 1969 to C. R. Jaescheke, et al, discloses the supporting of an electrical component on a row of leads of a support frame wherein the leads initially are rigidly interconnected at their outer ends. Inner ends of the leads and the component then are inserted in a shell with endmost ones of the row of leads riding in guide grooves in side walls of the shell, and after the component has been encapsulated in the shell, the outer ends of the leads are servered from one another. It also is known to insert leads of components through preformed apertures in an open frame, position the frame in a shell with bodies of the components within the shell, and then fill the shell with encapsulating material through the open frame.

Prior known arrangements as discussed above, however, are not particularly suited for applications in which, in order to conserve space, or where space is at a premium, it is desirable or necessary to mount the packaged component assembly in spaced relationship to a printed circuit board and in straddling relationship over other components on the board. Specifically, in these instances, in addition to the desirability of the encapsulated component assembly being easy to fabricate with leads of the components in exact predetermined positions for subsequent insertion through preformed apertures in the printed circuit board, it also is desirable that the portions of the component leads used to space the remainder of the assembly from the printed circuit board, be rigidly supported and electrically insulated about their periphery to preclude the possibility of bending or damage to the leads, or the shorting of the leads to other components on the board. At the same time, since many electrical components tends to malfunction or self-destruct when exposed to high temperatures, the construction of the component assembly should be such as to permit adequate air flow and ventilation between the assembly and the printed circuit board, to provide proper cooling of the assembly and the components being straddled by the assembly. It also is desirable that the encapsulated component assembly utilize a minimum amount of material consitent with achieving the desired objectives of moisture-proofing and electrically insulating the components thereof.

SUMMARY OF THE INVENTION

In general, in accordance with this invention an encapsulated component assembly includes a shell and a frame positioned in an open top or mouth of the shell. In forming the component assembly, a body of the component is received in the shell with a lead of the component extending from the body through a capillary passageway which runs from an inner bottom surface of the frame up to a top or outer end of the passageway. The shell then is filled with a settable encapsulating liquid up to the inner bottom surface of the frame and until the liquid rises or flows by capillary action up the passageway, whereupon the liquid is allowed to set to secure the lead in position in the capillary passageway and to bond the frame to the shell.

More specifically, in the encapsulated multi-component assembly, opposed side portions of the shell and the frame which define capillary passageways extending from the inner surface of the frame to outer ends of the opposed portions, also have a matched scalloped configuration to define rows of standoff legs for spacing the finished assembly from a printed circuit board, with the scalloped configuration providing ventilation between the printed circuit board and the assembly. In the forming of the component assembly, a body of each component initially is positioned adjacent the inner surface of the frame with the inner surface of the frame facing upward, and so that leads of the components are disposed in open-ended grooves in the leg portions of the frame at opposite sides thereof. The open mouth of the shell then is positioned over the frame and the component bodies to receive the component bodies in the shell. After the resultant assembly has been inverted, the shell is filled with encapsulating liquid through an opening in the frame until the liquid contacts the inner bottom surface of the frame and flows by capillary action up the passageways and about the leads to the outer upper ends of the standoff legs. During this filling of the shell with encapsulating liquid, capillary action also causes the liquid to flow upward between side walls of the shell and the periphery of the frame to form an assembly of integral unitary construction, with any excess flow of the encapsulating liquid over the side walls of the shell being prevented as a result of the peripheral edges of the frame being slightly depressed with respect to the adjacent edges of the shell.

DETAILED DESCRIPTION

Figure 1:
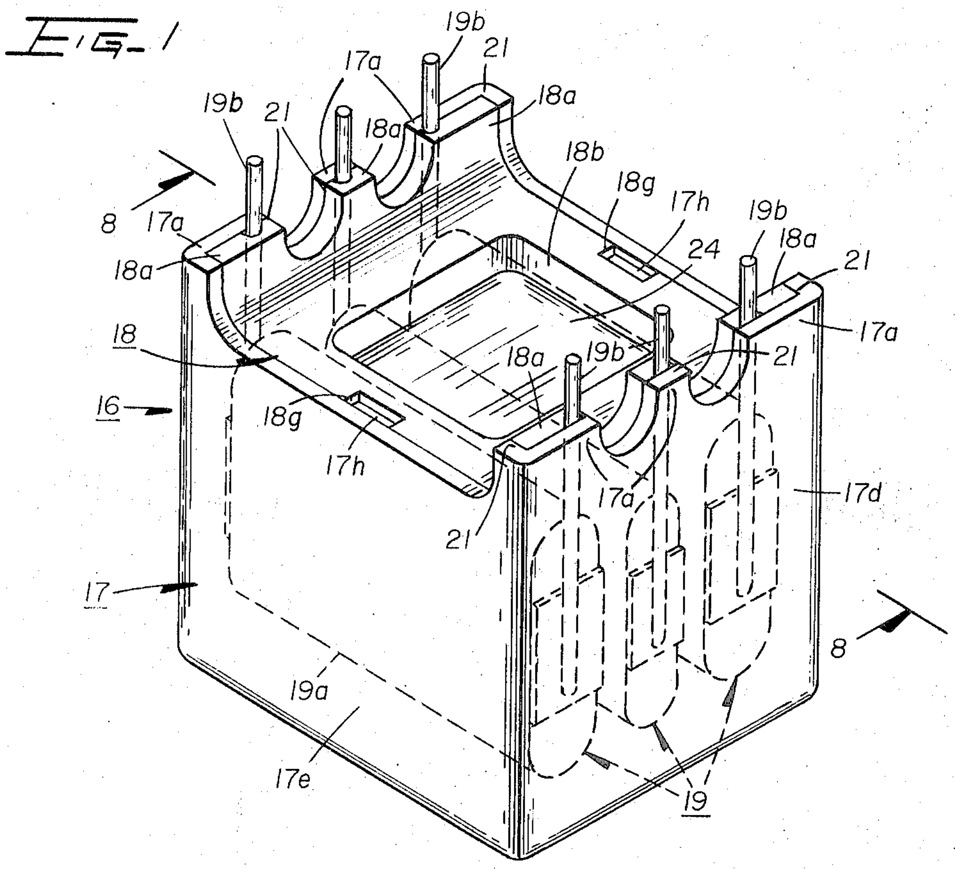
FIG. 1 is an isometric view of an encapsulated electrical component assembly in accordance with the invention.
Figure 2:
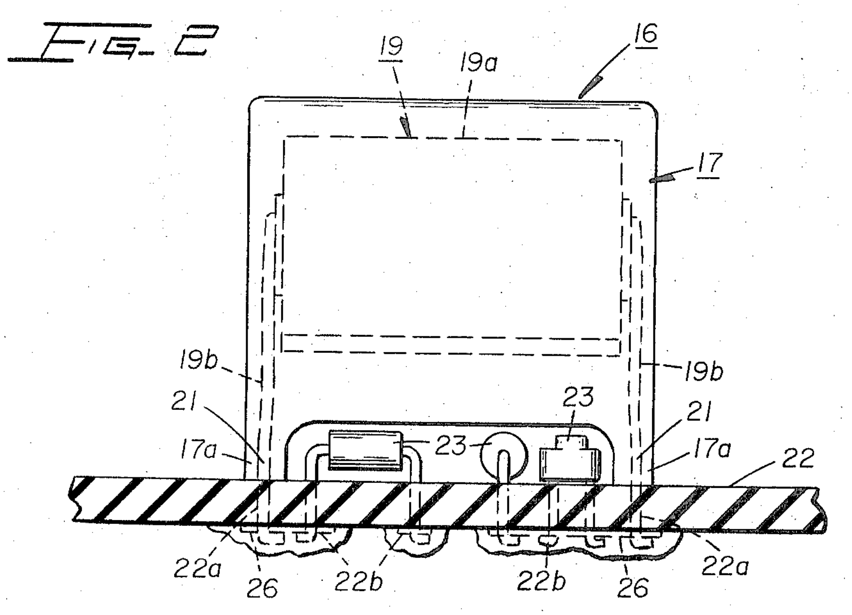
FIG. 2 is an elevational view of the encapsulated component assembly shown in FIG. 1, mounted on a printed circuit board.

Referring to FIG. 1, an encapsulated electrical component assembly 16 in accordance with the invention includes a shell member 17 of molded plastic, a frame 18 of molded plastic, and a plurality of electrical components 19, such as capacitors. Opposed standoff sections 17*a* and 18*a* of the shell 17 and the frame 18 define standoff legs 21 for mounting the assembly 16 on a printed circuit board 22, as shown in FIG. 2, in spaced relationship to the board and in straddling relationship to a plurality of other components 23 on the board. Each capacitor 19 has a body 19*a* which is wound from alternate layers of a metallized polyester film and flattened in a suitable manner. The ends of each capacitor body 19*a* then are spray soldered, the body is impregnated with wax, and a pair of radially projecting leads 19*b* are fixedly mounted on opposite ends of the body by soldering. Other electrical devices, such as other types of capacitors, resistors, diodes, etc., also are adapted to be packaged by the method of this invention.

The capacitors 19 are electrically insulated from one another and moisture-proofed by being encapsulated in the shell 17 and the frame 18 in a suitable potting material 24, the shell, frame and the potting material all having a relatively high dielectric strength and imperviousness to moisture. For example, the shell 17 and the frame 18 may be a thermosetting plastic such as that available under the tradename "Noryl" (SE—1) from the General Electric Company, Selkirk, N.Y, or a thermoplastic resin, such as an acrylonitrile-butadiencestyrene polymer available under the tradename "Cycolac" from Marbon Chemical, Division of Borg-Warner Corp, Washington, WV. In either instance, the potting material 24 may be an epoxy resin available under the tradename "Epi-rez" (Number 5071) from the Celanese Resins Division, Celanese Corp, Louisville, Ky, mixed with a suitable hardener.

The capacitors 19 are mounted in the shell 17 in accordance with this invention, in a manner to be described, so that outer free end portions of the capacitor leads 19*b* project from the packaged assembly 16 through the standoff legs 21 in exact positions, whereby the leads can be readily inserted into preformed apertures 22*a* in the printed circuit board 22 and through land areas 26 on the underside of the board, as illustrated in FIG. 2. Selected ones of the leads 19*b*, such as at the corners, then are crimped to the circuit board 22 to anchor the assembly thereto for a soldering operation, and the leads and the land areas 26 are encapsulated and soldered in a conventional manner. Suitable circuit paths 22*b* on the circuit board 22 also interconnect the capacitors 19 and the other components 23 on the board in a known manner, as necessary.

Figure 3:
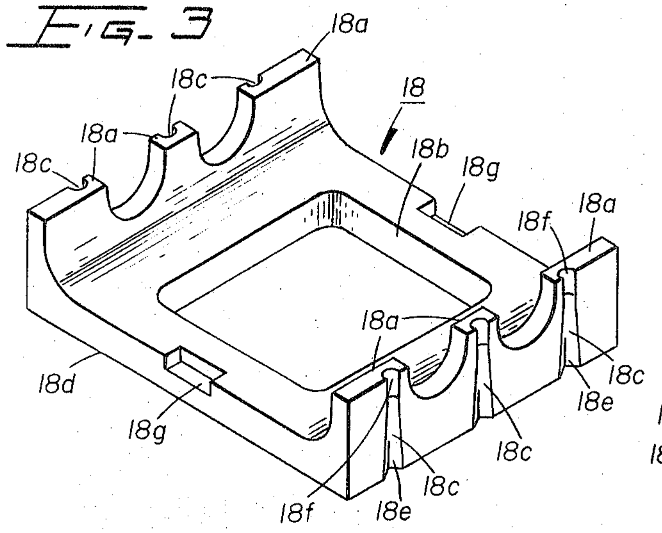
FIG. 3 is an isometric view illustrating a frame utilized in fabricating the encapsulated component assembly shown in FIG. 1.

As viewed in FIGS. 1 and 3, the molded frame 18, which is of generally rectangular construction, is provided with a central opening 18*b* and has sets of vertically extending grooves 18*c* formed in opposite sides thereof for receiving the leads 19*b* of respective ones of the capacitors 19. The grooves 18*c* are provided in the standoff leg sections 18*a* of the frame 18 and extend from a bottom surface 18*d* of the frame to upper ends of the standoff sections. Each of the lead receiving gooves 18*c* includes a flared or tapered guide portion 18*e* adjacent the bottom frame surface 18*d*, which merges into a wedge-shaped arcuate seat 18*f* adjacent the upper end or top of its standoff section 18*a*. The spacing between the seats 18*f* of each set of the grooves 18*c* is at least equal to, and preferably slightly greater than the spacing between the leads 19*b* of its respective capacitor 19, with the locations of the seats corresponding to the locations of the respective leadreceiving apertures 22 *a* in the printed circuit board 22. The frame 18 also is provided with a pair of tab-receiving recesses 18*g* adjacent its other opposite sides, and the frame bottom surface 18*d* preferably has a plurality of capacitor spacing projections 18*h* (FIGS. 5, 6 and 7) extending therefrom.

Figures 4, 6, 7:
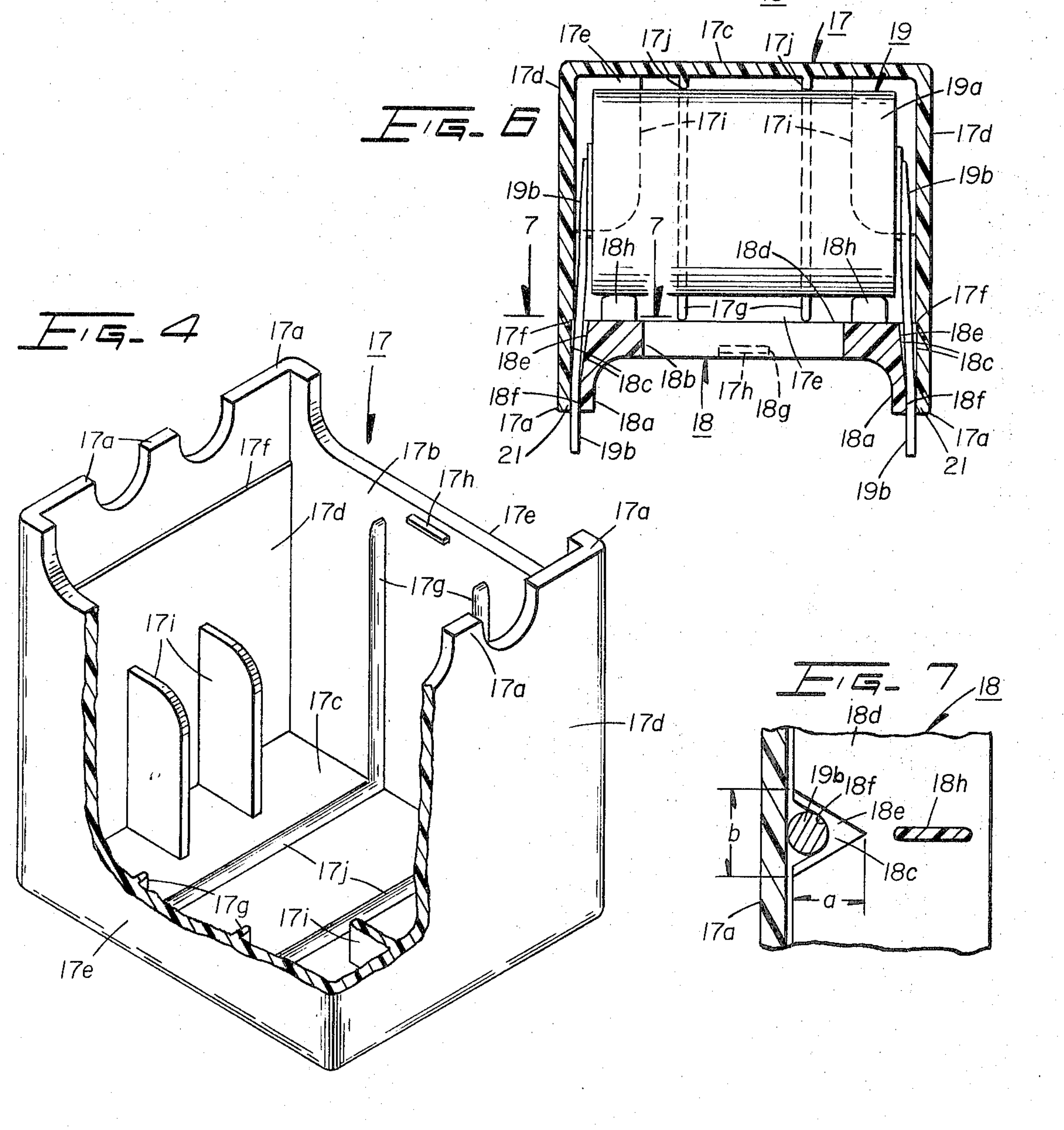
FIG. 4 is an isometric view illustrating a shell member utilized in fabricating the encapsulated component assembly shown in FIG. 1.
FIG. 6 is a view similar to FIG. 5 illustrating intermediate steps in the forming of the encapsulated component assembly.
FIG. 7 is an enlarged partial cross-sectional view taken along the line 7—7 in FIG. 6.
Figures 8, 9, 10, 11, 12:
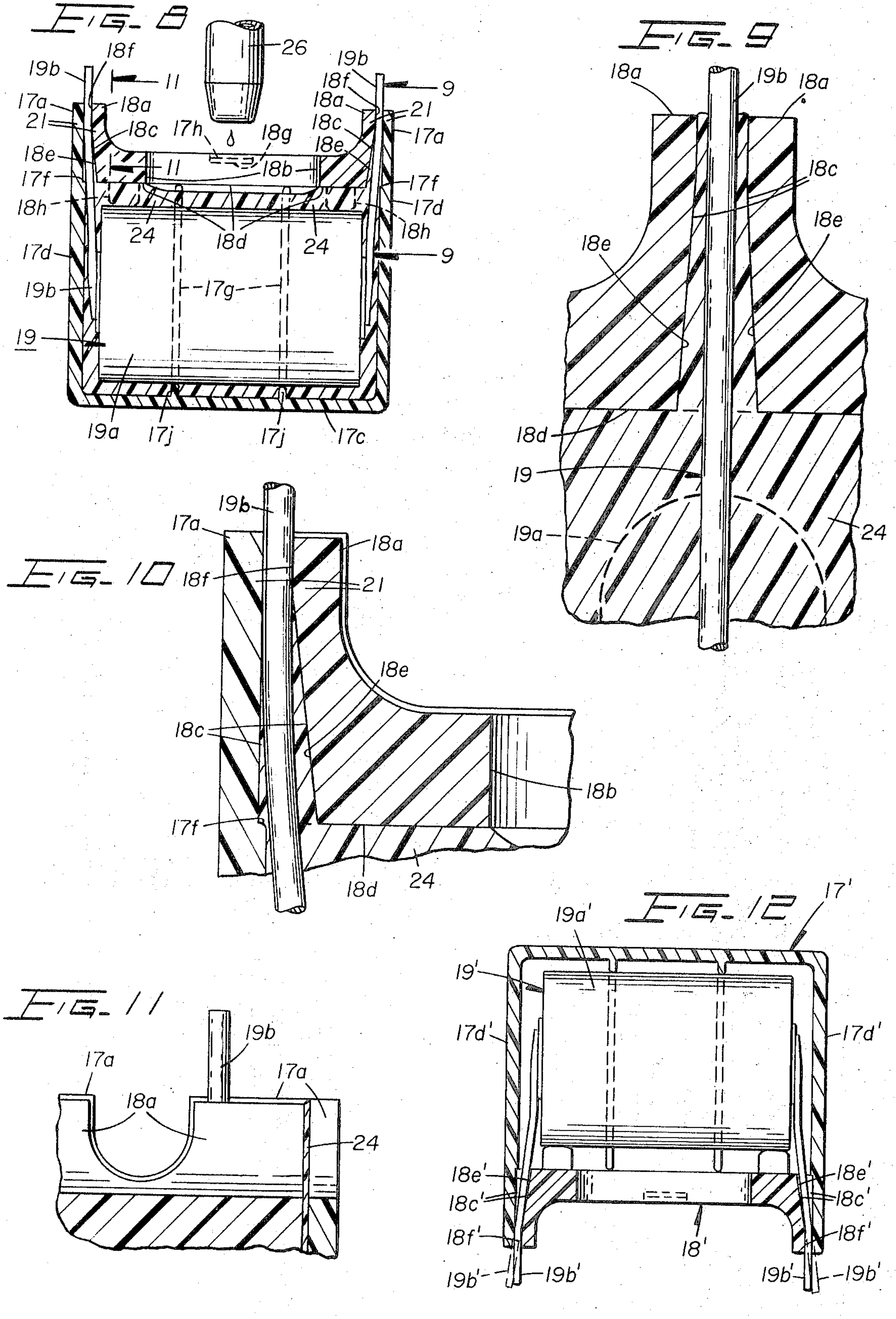
FIG. 8 is a cross-sectional view taken along line 8—8 of FIG. 1 illustrating an encapsulating step in the forming of the encapsulated component assembly.
FIG. 9 is an enlarged cross-sectional view taken along the line 9—9 in FIG. 8, illustrating how a lead of a component is encapsulated by capillary action.
FIG. 10 is an enlarged partial cross-sectional view of the encapsulated component assembly as it is shown in FIG. 8.
FIG. 11 is an enlarged partial cross-sectional view of the encapsulated component assembly taken along the line 11—11 in FIG. 8.
FIG. 12 is a cross-sectional view similar to FIG. 6 and showing an alternate embodiment of the invention.

As viewed in FIGS. 1 and 4, the molded shell 17 has and open top or mouth 17*b* and an inner bottom wall 17*c* in opposed relationship, and pairs of opposed side walls 17*d* and 17*e*. When the frame 18 is located within the open mouth 17*b* of the shell 17 as shown in FIGS. 1 and 8, the frame is seated on horizontal ledges 17*f* formed on the shell side walls 17*d* and/or on upper ends of opposed pairs of vertical capacitor spacing ribs 17 *g* on the shell side walls 17*e*. The shell 17 is secured to the frame 18 by inwardly directed locking tabs 17*h* on the opposed side walls 17*e* and engaged in the frame recesses 18*g*, and by the potting material 24. The shell 17 also is provided with vertical intermediate walls or fins 17*i* which divide the shell 17 into a plurality of capacitor receiving compartments, and the shell bottom wall 17*c* includes a pair of upwardly projecting capacitor spacing ribs 17*j*. The side walls 17*d* of the shell 17 have scalloped portions between the standoff sections 17*a* in matched relationshp to scalloped portions of the frame 18 between its standoff sections 18*a*, to provide air flow and ventilation beneath the packaged assembly 16 when it is mounted on the printed circuit board 22, and to reduce the amount of material utilized in the shell and the frame while providing added support to insure the parallel relationship of the projecting capacitor leads 19*b*.

Figure 5:
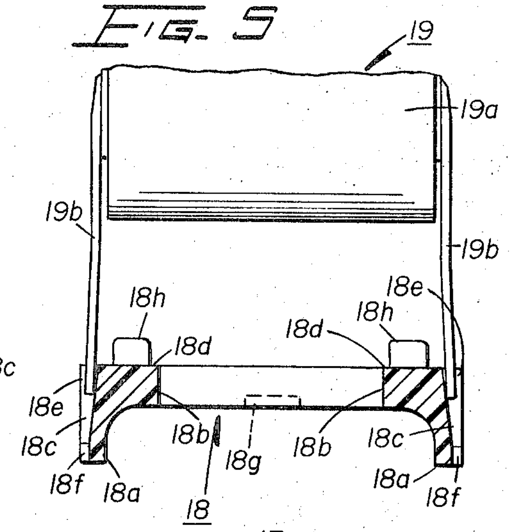
FIG. 5 is a cross-sectional view illustrating an initial step in the forming of the encapsulated component assembly shown in FIG. 1.

FIG. 5 illustrates an initial step in the forming of the packaged component assembly 16 of FIG. 1, wherein the frame 18 is suitably supported with its surface 18*d* facing upward and with the standoff leg sections 18*a* of the frame projecting downward. Each of the capacitor bodies 19*a* then is positioned above the frame 18 with outer ends of its leads 19*b* disposed in the guide portions 18*e* of respective ones of the grooves 18*c*, and the body is moved downward to the position shown in FIG. 6 in which the leads are received in their respective seats 18*f* and the outer free end portions of the leads project downward beyond the standoff sections 18*a*. Since the spacing of the seats 18*f* is slightly greater than the spacing of the leads 19*b*, as above described, the portions of the leads in the seats then grip the frame 18 lightly to retain the body 19*a* of the capacitor 19 in an essentially upright position for the next assembling operation.

As is illustrated in FIG. 6, after the capacitors 19 have been mounted on the frame 18, the shell 17 next is positioned over the capacitors and the frame, and is moved downward on the frame into assembled relationship therewith. During this movement of the shell 17, the capacitor bodies 19*a* are received within the shell in their respective compartments as defined by the intermediate fins 17*i*, to isolate the capacitor bodies electrically from one another. In instances where the capacitors 19 are of different capacitance values and have bodies 19*a* of different widths, by spacing the fins 17*i* apart and from the shell side walls 17*e* accordingly, the fins also can be used to insure that the capacitors have been located in their proper respective positions on the frame 18, since if they are not in their proper positions it then will be impossible for the shell 17 to be assembled to the frame.

The downward movement of the shell 17 is continued until the frame 18 engages the stop ledges 17*f* on the shell sidewalls 17*d* and/or the ends of the spacer ribs 17*g* on the shell side walls 17*e*. At the same time, the locking tabs 17*h* on the shell side walls 17*e* initially ride over the adjacent sides of the frame 18 to cause outward flexing of the side walls, and then snap into the recesses 18*g* in the frame to lock the shell and the frame together. As is best shown in FIG. 7, the capacitor leads 19*b* now are pressed firmly into their respective seats 18*f* in the frame standoff sections 18*a*, by the shell standoff sections 17*a*, and are supported about substantially their entire periphery by the standoff sections. The shell standoff sections 17*a* also cooperate with their opposed grooves 18*c* in the frame standoff sections 18*a* to define capilliary passageways in which the leads 19*b* are received in exact predetermined positions for an encapsulating operation.

Referring to FIG. 8, the assembled shell 17, frame 18 and capacitors 19 now are inverted for filling of the shell with the encapsulating material 24. Specifically, as viewed in FIG. 8, the encapsulating material 24 in liquid form is introduced into the shell 17 from a nozzle 26 through the central opening 18*b* in the frame 18 to submerge the bodies 19*a* of the capacitors 19 and until the liquid wets the frame's bottom or inner surface 18*d*, whereupon the liquid flows by capillary action up the grooves 18*c* in the sides of the frame and about the capacitor leads 19*b* to the upper ends of the shell and frame standoff sections 17*a* and 18*a*, as illustrated in FIG. 9. The dimensions of the shell 17 and the frame 18 also are selected so that there is a slight degree of clearance, such as several thousandths of an inch, between the sides of the frame and the interior surfaces of the shell side walls 17*d* and 17*e*, as illustrated in FIG. 7, to provide small gaps through which the encapsulating material 24 flows by capillary action to upper adjacent edges of the frame and the shell. Thus, when the encapsulating material 24 then is allowed to set to a hardened condition, the leads 19*b* become securely lock in the capillary passageways, and the shell 17 and the frame 19 become bonded to one another to form a unitary integral assembly.

Referring to FIGS. 5, 6, and 7, the tapered guide portion 18*e* of each groove 18*c* where it opens through the frame surface 18*d* must be small enough to overcome the meniscus effect of the encapsulating material 24, but preferably is made as large as possible consistent with this requirement, to facilitate the positioning of one of the capacitor leads 19*b* therein as shown in FIG. 5. The size of the opening through the frame surface 18*d*, of course, will vary depending on the size of the lead 19*b* and the capillary characteristics of the encapsulating material 24 being used in a particular instance. However, by way of example, with a lead diameter of 0.032 inch and an epoxy resin encapsulating material 24 as noted hereinabove, favorable results have have been achieved with a triangular opening in the frame surface 18*d*, as shown in FIG. 7, having a base "*b*" and an altitude "*a*" on the order of 0.062 inch As is best shown in FIG. 7, the seat 18*f* of each groove 18*c* has an inner portion of circular configuration which conforms to the periphery of the lead 19*b*, and in which the lead is firmly held by the opposed shell standoff section 17*a* to locate the lead in proper position for subsequent insertion in the printed circuit board 22, as noted hereinabove. If desired, the seat 18*f* also may be dimensioned so that the lead 19*b* spaces the shell standoff section 17*a* from the frame standoff section 18*a* a slight distance to insure capillary flow therebetween as above described. The circular inner portion of the seat 18*f* merges into tangential side surfaces of the groove 18*c* which are flared outwardly to facilitate proper movement of the lead 19*b* into the seat during the assembling operations shown in FIGS. 5 and 6. These flared side surfaces of the groove 18*c* also provide openings at their respective end of the passageway defined by the groove and the shell standoff section 17*a*, to insure proper venting of the passageway of air during the encapsulating step, in order that the desired capillary flow of the ecapsulating material 24 up the passageway will take place even though the shell and frame standoff sections 17*a* and 18*a* may be in a close mating relationship.

During the filling of the shell 17 with the encapsulating material 24, overflow of the material above the capillary passageways defined by the shell and frame standoff sections 17*a* and 18*a* is prevented by the fact that the lead 19*b* in each passageway substantially fills the upper end thereof, and by the surface tension of the material meniscus which is formed at the passageway's upper end. Similarly, flow of the encapsulating material 24 above the upper edges of the frame 18 and the shell 17, through the capillary gaps therebetween, is prevented by the surface tension of the material meniscus at the top of these gaps. However, to preclude the possiblility of any excess flow of the encapsulating material 24 above and over the side walls 17*d* and 17*e* of the shell 17, the frame 18 preferably is dimensioned vertically so that when it is in its assembled position in the shell, as shown in FIG. 8, the upper edges of the frame are displaced slightly below (several thousanths of an inch) the adjacent edges of the shell, as illustrated in FIGS. 10 and 11. As a result, any of the encapsulating material 24 which does flow upward out of the capillary gaps, flows inward over the frame 18, rather than over the side walls 17*d* and 17*e* of the shell 17.

It also is considered within the purview of the invention to form the frame 18 with standoff legs of generally cylindrical construction and having internal passageways through which the capacitor leads 19*b* may be received and subsequently encapsulated by the capillary flow of the encapsulating material 24 up the passageways, instead of the standoff legs 21 formed by the opposed shell and frame standoff sections 17*a* and 18*a*, as above described. However, the latter arrangement is preferred because of the relative ease with which the capacitor leads 19*b* can be mounted on the frame 18, and the greater accuracy with which the leads can be located in the seats 18*f*, thus facilitating subsequent insertion of the leads in the preformed apertures 22*a* in the printed circuit board 22.

FIG. 12 illustrates an alternate embodiment of the invention which can be utilized where it is desired to provide increased spacing of ends of bodies 19*a'* of capacitors 19' (only one shown) from side walls 17*d'* of a shell 17', in comparison to that achieved in the embodiment of the invention shown in FIGS. 1–11. In FIG. 12, lead-receiving grooves 18*c'* in opposite sides of a frame 18' are spaced apart a distance substantially greater than the spacing of leads 19*b'* of the respective capacitor 19'. Thus, as the capacitor 19' is mounted on the frame 18' with the leads 19*b'* riding in guide portions 18*e'* of the grooves 18*c'*, outer free portions of the leads initially are flexed outward beyond the ends of the capacitor body 19*a'* as illustrated in broken lines. Subsequently, as the shell 17' is positioned over the frame 18', the side walls 17*d'* of the shell cause reverse-bending of the outer portions of the leads 19*b'* into seats 18*f'* of the grooves 18*c'*, as illustrated in solid lines, with the relatively rigid self-supporting leads then retaining the ends of the capacitor bodies 19*a'* spaced from the shell side walls 17*d'*. In the alternative, the capacitor leads 19*b'* may be preformed to their desired final configuration as shown in solid lines, to reduce the possibility of placing excessive stress on the soldered connections of the leads to the capacitor bodies 19*a'* during the assembling operation. In any event, after the shell 17', frame 18' and capacitors 19' have been assembled, they are inverted and encapsulating material is introduced into the shell as described above in the embodiment of FIGS. 1–11.

In summary, a straddle-type encapsulated component assembly 16, as shown in FIG. 1, and a method of fabricating it, has been provided in which a plurality of electrical components, such as the capacitors 19, can be readily packaged with portions of the capacitor leads 19*b* projecting straight from the assembly through standoff legs 21 in exact parallel relationship. As a result, the assembly 16 can readily be mounted ôn a printed circuit board 22 in spaced relationship to the board and in straddling relationship to other components 23 on the board, as shown in FIG. 2, with standoff portions of the capacitor leads 19*b* fully encased and supported about their entire periphery with dielectric insulating material, to preclude the possibility of bending or damage to the leads, or the shorting of the leads, to the other components. The scalloped configuration of the shell side walls 17*d* and the frame 18 between the shell and frame standoff sections 17*a* and 18*a* also provides a construction which facilitates air flow and ventilation between the assembly 16 and the printed circuit board 22 for cooling purposes, while reducing the amount of material required in the finished assembly and still providing maximum support for the capacitor leads 19*b*.

What is claimed is:

1. An encapsulated assembly including a component having a lead extending therefrom, which comprises:

a shell having an open mouth and opposed side walls;

a frame positioned in the open mouth of said shell between said shell side walls, said frame having a standoff section projecting outward in a direction parallel to said shell side walls ahd having a passageway in said standoff section the passageway receiving the component lead and providing sufficient space within the passageway to permit capillary flow of an encapsulating liquid up the passageway to an outer end of said standoff section; and an encapsulating material within said shell contacting said shell side walls and an inner surface of said frame and extending within the passageway about the lead to the outer end of said standoff section and securing the lead in position in the passageway and bonding said frame to said shell.

2. An encapsulated assembly including a component having a body with a lead extending therefrom, which comprises:

a shell in which the component body is received having an open top;

a frame fitted within the open top of said shell having a section extending upward substantially to the top of said shell and having a passageway in the periphery of said frame section extending from a bottom surface of said frame substantially to the top of said shell the passageway receiving the component lead and providing sufficient space within the passageway to permit capillary flow of an encapsulating liquid up the passageway to the top of said shell; and an encapsulating material within the shell contacting the bottom surface of said frame and extending within the passageway and locking the lead in position in the passageway and bonding said frame to said shell.

3. An encapsulated assembly as recited in claim 2, which further comprises:

a standoff leg extending from said frame and shell for mounting the assembly on a support member with said capillary passageway extending through said standoff leg.

4. An encapsulated component assembly, which comprises:

a shell having an open mouth and a side wall which includes a standoff section projecting outward in a direction parallel to said side wall adjacent the open mouth of said shell;

a frame positioned in the open mouth of said shell and having a standoff section in opposed relationship to said standoff section of said shell, said standoff sections defining a standoff leg from the component assembly and having opposed portions which form a passageway extending from an inner surface of said frame to outer ends of said standoff sections for receiving a component lead and an encapsulating material for the lead;

a component having a body disposed in said shell with a component lead extending from the body through the passageway and projecting outward beyond the outer ends of said stanodff sections; and an encapsulating material within the shell in contact with the inner surface of said frame and filling the passageway formed by said shell and frame standoff sections and securing the component lead in the passageway and bonding said frame to said shell.

5. An encapsulated component assembly as recited in claim 4, in which:

the passageway is defined in part by an open-ended groove in said frame standoff section with said shell standoff section defining at least one side of the passageway.

6. An encapsulated assembly as recited in claim 4, in which:

said frame standoff section is spaced from said shell standoff section a distance sufficient to define a capillary gap therebetween;

the encapsulating material within the shell extends from the inner surface of said frame up the gap to the outer ends of said frame and said shell standoff sections and bonds said frame to said shell; and the outer end of said frame standoff section is depressed a sufficient amount with respect to the outer end of said shell standoff section to preclude flow of the encapsulating material above and over said shell standoff section.

7. An encapsulated electrical component assembly, which comprises:

a dielectric shell having an inner wall and an open mouth in opposed relationhsip, said shell including a pair of opposed side walls each having standoff sections projecting outward in a direction parallel to said side walls adjacent the open mouth of said shell;

a dielectric frame positioned in the open mouth of said shell between said shell sidewalls, said frame having an opening therethrough and having standoff sections at opposite sides thereof in opposed relationship to respective ones of said shell standoff sections, said frame standoff sections having open-ended grooves facing said shell standoff sections and extending from an inner surface of said frame to outer ends of said frame standoff sections.

a plurality of electrical components each having a body disposed in said shell between the inner wall of said shell and the inner surface of said frame, each component body having projecting leads positioned in individual ones of the grooves in said frame standoff sections and projecting outward beyond said shell and frame standoff sections; and a hardened encapsulating material filling the shell between the inner wall of said shell and said frame, and filling the grooves in said frame standoff sections, said hardened encapsulating material locking the leads in predetermined positions and bonding said frame to said shell.

8. An encapsulated electrical component assembly, as recited in claim 7, in which:

said shell side walls and said frame have a matched scalloped configuration to define rows of said opposed shell and frame standoff sections on opposite sides of the assembly.

9. In a method of encapsulating a component and locking in position a lead extending from the component, the steps of:

positioning the lead in an open-ended groove formed in a side of a frame;

placing the frame within a shell with the groove opposite a side wall of the shell to form a capillary passageway;

floiwng a settable liquid into the shell until the liquid rises by capillary action about the lead in the passageway to the top of the passageway; and setting the liquid to lock the lead in position in the passageway and to bond the frame to the side wall of the shell.

10. A method of encapsulating a component having a body with a projecting lead within a shell, which comprises:

positioning the lead of the component within a open-ened groove formed in a side of a frame, the groove being of such dimensions as to cooperate with a side wall of the shell to form a passageway running from a bottom of the frame and terminating substantially at a top of the shell for receiving and conducting by capillary action a settable encapsulating liquid to the top of the shell;

assembling the frame in the shell, with the component lead within the groove, to position the component body within the shell and to position the groove opposite the side wall of the shell with the lead extending upward beyond the shell;

flowing settable encapsulating liquid into the shell until the liquid contacts the bottom of the frame and flows by capillary action up the passageway and about the lead to the top of the shell; and setting the encapsulating liquid to secure the lead in the passageway and to secure the frame to the shell.

11. A method as defined in claim 10 wherein:

the side of the frame is spaced from the side wall of the shell to provide a capillary gap; and the liquid is flowed by capillary action up the gap so that the setting of the encapsulating liquid further secures the frame to the side wall of the shell.

12. A method of encapsulating a component having a body with a lead extending therefrom, which comprises:

forming an external shell having an open top and an inner side wall;

forming a frame having an opening therethrough and a side with an open-ended groove which cooperates with the inner side wall of the shell to form a capillary passageway of sufficient size to receive the component lead while having sufficient space to permit the capillary flow of an encapsulating fluid up the passageway;

positioning the component lead in the side groove of the frame with the lead extending beyond opposite ends of the groove;

mounting the frame in the open top of the shell with the component body within the shell and the component lead extending beyond a top portion of the shell, and with a top portion of the frame adjacent the top portion of the shell so that the side groove in the frame cooperates with the inner side wall of the shell to form a capillary passageway running from an inner bottom surface of the frame to the adjacent top portions of the frame and the shell;

flowing a settable encapsulating liqud through the opening in the frame to submerge the component body and to wet the inner bottom surface of the frame to such an extent that the liquid flows by capillary action up the passageway about the lead to the adjacent top portions of the frame and the shell; and setting the liquid to encapsulate the component body within the shell and the component lead within the passageway.

13. A method of encapsulating a component having a body with leads extending from opposite ends of the body, which comprises:

forming a shell having an open mouth and opposed side walls with standoff sections extending in a direction parallel to the side walls;

forming a frame having an opening therethrough and having standoff sections with open-ended grooves which cooperate with respective ones of the standoff sections of the shell to form capillary passageways each of sufficient size to receive one of the component leads while having sufficient space to permit capillary flow of an encapsulating liqud up the passageway;

positioning the frame with an inner surface thereof facing upward and the frame standoff sections projecting downward;

positioning the component body adjacent the upwardly facing inner surface of the frame with the component leads in the grooves of the frame standoff sections and extending beyond the downwardly projecting standoff sections;

positioning the open mouth of the external shell over the component and the frame so as to receive the component body within the shell and so that the shell standoff sections and the grooves in the frame standoff sections from capillary passageways running from the inner surface of the frame to outer ends of the standoff sections;

inverting the assembled shell, frame and component;

flowing a settable encapsulating liquid through the opening in the frame to submerge the component body and to wet the inner surface of the frame such that the liquid flows by capillary action up the passageways to the outer ends of the frame and shell standoff sections; and setting the liquid to encapsulate the component body within the shell and the component leads in the passageways.

14. The method as defined in claim 13, which further comprises:

dimensioning the periphery of the frame and the interior walls of the shell to provide capillary gaps therebetween;

flowing the encapuslating liquid until it rises up the gaps by capillary action so that the subsequent setting of the liquid in the gaps bonds the frame to the shell; and locating peripheral outer edges of the frame in depressed relationship to respective adjacent peripheral edge portions of the shell prior to filling the shell with the encapsulating liuqid, to prevent flow of the liquid above and over the side walls of the shell during the filling operation.

* * * * *

UNITED STATES PATENT OFFICE
CERTIFICATE OF CORRECTION

Patent No. 3,838,316 Dated September 24, 1974

Inventor(s) D. R. Brown-J. W. Linsley, Jr.-R. F. Porod

It is certified that error appears in the above-identified patent and that said Letters Patent are hereby corrected as shown below:

Column 1, line 45, "servered" should read --severed--. Column 2, line 2, "tends" should read --tend--. Column 2, line 10, "consitent" should read --consistent--. Column 3, line 63, "butadience" should read --butadiene--. Column 4, line 29, "gooves" should read --grooves--. Column 4, lines 37 & 38, "leadreceiving" should read --lead-receiving--. Column 4, line 45, "and" first occurrence should read --an--. Column 4, line 62, "relationshp" should read --relationship--. Column 6, line 11, "lock" should read --locked--. Column 6, line 27, delete "have" second occurrence. Column 6, line 30, after "inch" insert a period (.). Column 6, line 51, "ecapsulating" should read --encapsulating--. Column 8, line 22, "ahd" should read --and--. Column 9, line 10, "stanodff" should read --standoff--. Column 10, line 15, "floiwng" should read --flowing--. Column 10, line 25, "ened" should read --ended--. Column 11, line 7, "liqud" should read --liquid--. Column 11, line 29, "liqud should read --liquid--. Column 12, line 26, "encapuslating" should read --encapsulating--. Column 12, line 33, "liuqid" should read --liquid--.

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*